United States Patent
Varughese et al.

(10) Patent No.: US 10,312,954 B1
(45) Date of Patent: Jun. 4, 2019

(54) IDENTIFICATION OF RFI (RADIO FREQUENCY INTERFERENCE)

(71) Applicant: International Business Machines Corporation, Armonk, NY (US)

(72) Inventors: Melvin Mathew Varughese, Capetown (ZA); Francois P S Luus, Johannesburg (ZA); Ismail Y Akhalwaya, Johannesburg (ZA); Arun Aniyan, Capetown (ZA); Monica Obrocka, Johannesburg (ZA)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/853,883

(22) Filed: Dec. 25, 2017

(51) Int. Cl.
  *H04B 3/46* (2015.01)
  *H04B 1/10* (2006.01)
(52) U.S. Cl.
  CPC ................... *H04B 1/1027* (2013.01)
(58) Field of Classification Search
  CPC .................................... H04B 1/1027
  USPC ........................................ 375/227
  See application file for complete search history.

(56) References Cited

U.S. PATENT DOCUMENTS

| | | | | |
|---|---|---|---|---|
| 6,014,412 A * | 1/2000 | Wiese | ........... | H04B 1/123 329/318 |
| 8,433,248 B2 * | 4/2013 | Sreerama | ........... | H04B 17/318 455/63.1 |
| 8,471,760 B2 * | 6/2013 | Szajnowski | ........... | G01S 7/023 342/104 |
| 8,483,621 B2 * | 7/2013 | Sreerama | ........... | H04B 17/345 455/296 |
| 8,565,294 B2 | 10/2013 | Szajnowski | | |
| 8,676,147 B1 | 3/2014 | Curry et al. | | |
| 9,596,610 B1 | 3/2017 | Querol Borras et al. | | |
| 2008/0045175 A1 | 2/2008 | Yoon et al. | | |
| 2009/0325530 A1 | 12/2009 | Sreerama | | |
| 2016/0307418 A1 * | 10/2016 | Pantus | ........... | G01S 7/415 |

(Continued)

FOREIGN PATENT DOCUMENTS

EP     0576100     9/1999

OTHER PUBLICATIONS

Tarongi et al., "Radio Frequency Interference detection algorithm based on spectrogram analysis", 2010 IEEE International Geoscience and Remote Sensing Symposium, Jul. 2010, pp. 2499-2502.

(Continued)

*Primary Examiner* — Helene E Tayong
(74) *Attorney, Agent, or Firm* — Eyal Gilboa; Otterstedt, Ellenbogen & Kammer, LLP.

(57) ABSTRACT

A computer-implemented method to identify RPI (Radio Frequency Interference) in a spectrogram includes dividing, by a matrix module of a computer processor, the spectrogram into a plurality of blocks, each block comprising a matrix of data points. The method includes applying, by a masking module of the computer processor, a plurality of matrix pooling functions to each block, the plurality of matrix pooling functions configured to produce a plurality of summarized pools. The method includes creating, by a masking module of the computer processor, a line mask for each of the pools and creating, by the masking module, an RPI mask based at least on the line masks, the RPI mask being indicative of RPI.

20 Claims, 13 Drawing Sheets

(56) References Cited

U.S. PATENT DOCUMENTS

2017/0083792 A1    3/2017  Rodriguez-Serrano et al.
2017/0261615 A1*   9/2017  Ying ...................... G01S 19/21

OTHER PUBLICATIONS

Wolfaardt et al., "Statistical classification of radio frequency interference (RFI) in a radio astronomy environment", 2016 Pattern Recognition Association of South Africa and Robotics and Mechatronics International Conference (PRASA-RobMech), 2016.

Hillebrand, "Detection and Visualisation of Radio Frequency Interference", Mathematics of Computer Science Course Project, University of Cape Town, Oct. 2014.

Offringa, "The SumThreshold method: technical details", Technical report, Oct. 15, 2013. Available at: http://andreoffringa.org/pdfs/SumThreshold-technical-report.pdf.

Offringa et al., "A morphological algorithm for improving radio-frequency interference detection", Astronomy & Astrophysics, 2012, vol. 539.

* cited by examiner

IDENTIFICATION OF RFI (RADIO FREQUENCY INTERFERENCE)

BACKGROUND

Non-persistent RFI (Radio Frequency Interference) in fast wideband spectrograms is usually divided into many small events over time, resulting in too many events to usefully summarize the RFI in a measurement, where such summary is to help identify RFI culprit frequencies and to characterize further RFI sources.

The present invention relates to RFI analysis and example embodiments provide a computer-implemented method and computer system to identify RFI, e.g., in fast wideband RF (Radio Frequency) spectrograms of a fast radio receiver measurement.

SUMMARY

An example embodiment of the present invention provides a computer-implemented method to identify RFI (Radio Frequency Interference) in a spectrogram. The method may comprise dividing, by a matrix module of a computer processor, the spectrogram into a plurality of blocks, each block comprising a matrix of data points. The method may comprise applying, by a masking module of the computer processor, a plurality of matrix pooling functions to each block, the plurality of matrix pooling functions configured to produce a plurality of summarized pools. The method may comprise creating, by a masking module of the computer processor, a line mask for each of the pools and creating, by the masking module, an RFI mask based at least on the line masks, the RFI mask being indicative of RFI.

The method may further comprise dividing, by the matrix module, the RFI mask into columns and combining, by the pooling module, the columns to form a new, smaller RFI mask.

Example embodiments of the present invention may extend to associated computer systems and computer program products.

DETAILED DESCRIPTION

An example embodiment of the present invention is for processing and/or summarizing RFI in fast wideband RF spectrograms of a fast radio receiver measurement. This is realized using matrix pooling operations to summarize RFI from the spectrogram. This may be a computationally efficient method of analysis.

Non-persistent RFI in fast-rate spectrograms is usually divided into a lot of small events over time resulting in too many events to usefully summarize RFI in a single measurement. The RFI summary proposed in the example embodiment of the invention may help identify RFI culprit frequency bands and further characterize the RFI sources, e.g., through statistical modeling of occurrence time series, and is intended to computationally efficiently locate RFI events in spectrograms and group broken and persistent events into singular events to neatly summarize RFI.

Use of pooling functions on a spectrogram matrix may retain detection sensitivity yet reduce computational overhead in obtaining robust percentile/cardinality thresholds in detecting a variety of different types of RFI where the user can define which types to detect. Computational overhead may be reduced by reducing non-overlapping spectrogram windows to scalar values according to a predefined statistical operation like maximum, minimum, average, and difference (or peak-to-peak). Sensitivity may retained by keeping high power pixel values through maximum pooling, although precision may be traded off.

Figure 4:
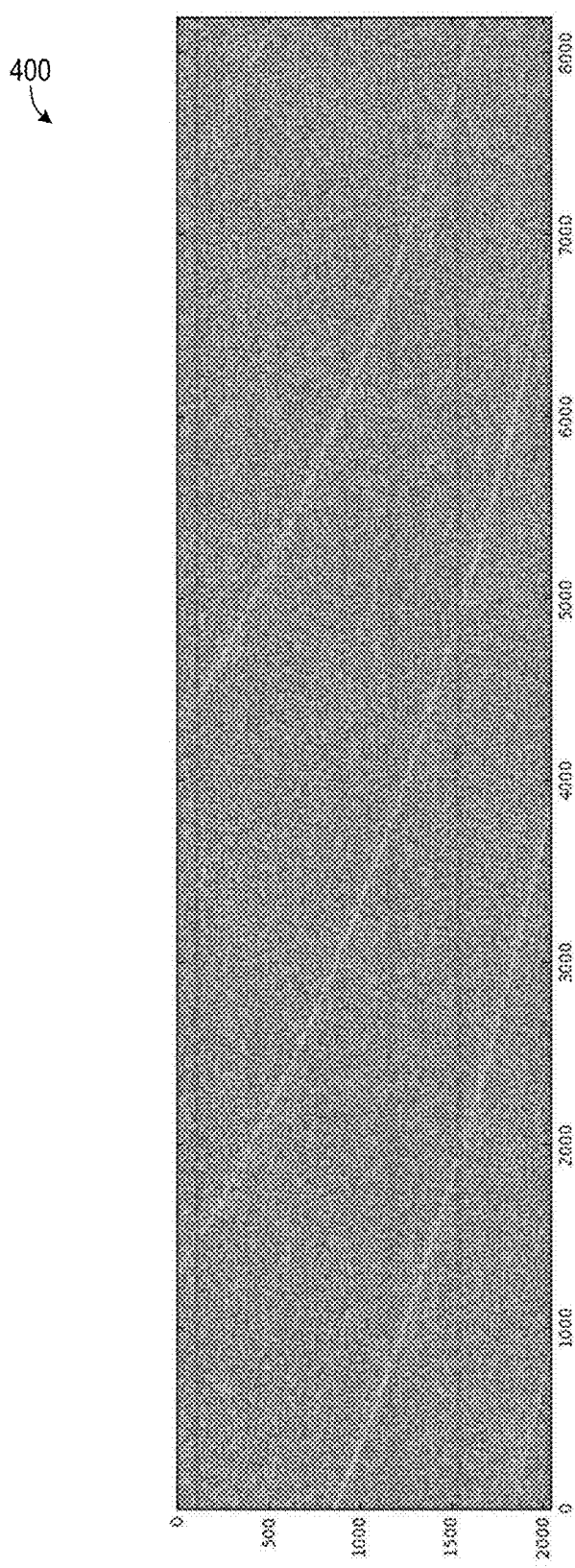
FIG. 4 illustrates an example spectrogram.

FIG. 4 illustrates a graphical example of a spectrogram 400 (or a fragment or time-slice of a full spectrogram). This spectrogram 400, like many spectrograms, was generated by an astronomical radio telescope. For example, the spectrogram 400 has a time value on an x-axis and a frequency value on a y-axis. Example embodiments of this invention are described with reference to astronomical data where the method and system may find application. However, it will be appreciated that the invention is not limited to astronomical data and may find application in spectrograms from other sources.

The specific techniques to generate the spectrogram 400 are not germane to this invention. Spectrograms tend to include massive volumes of data, so full spectrograms may be fragmented or slice into smaller, more manageable fragments.

Figure 1:
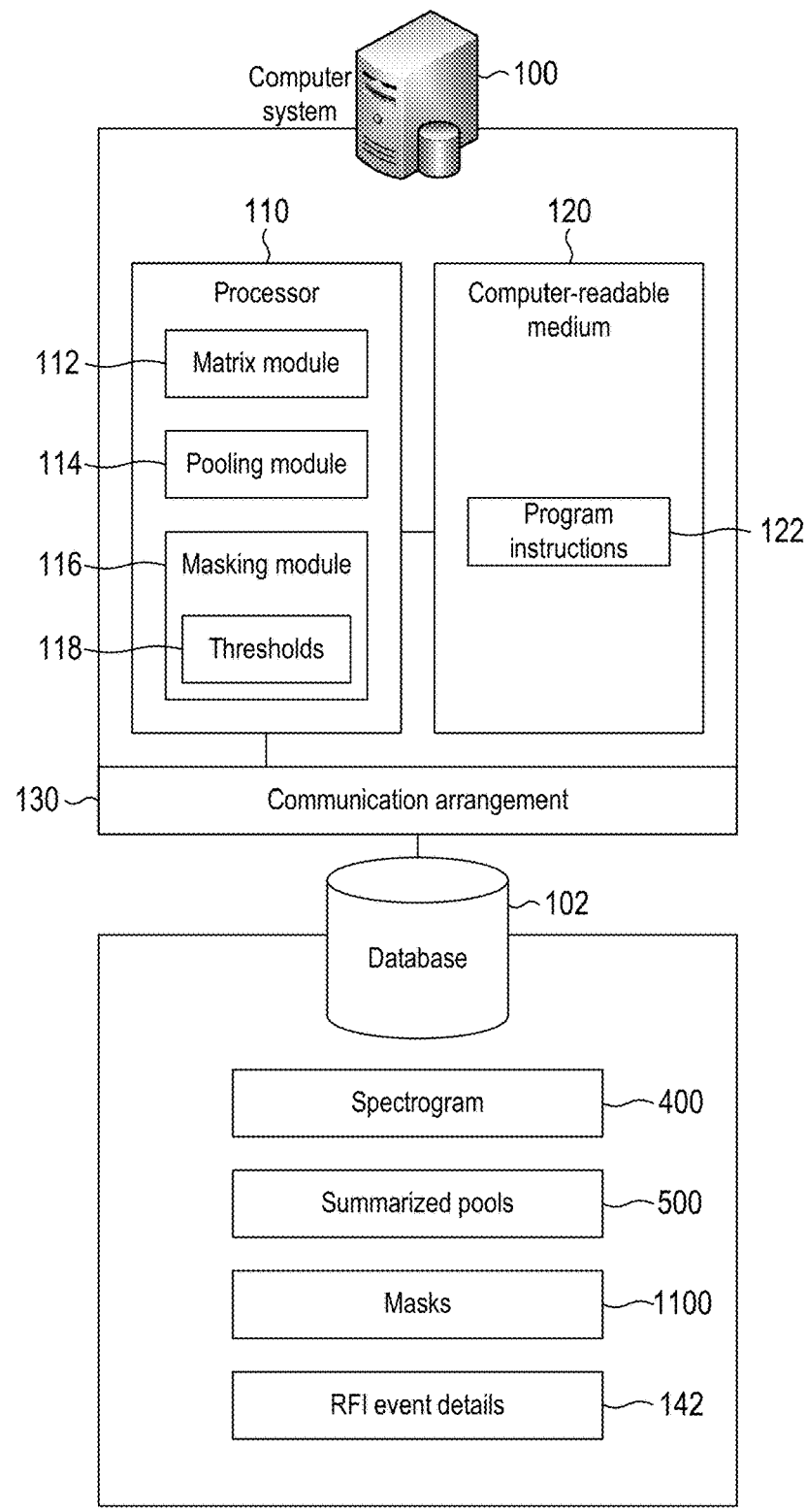
FIG. 1 illustrates a computer system to identify RFI in a spectrogram, in accordance with an embodiment of the invention.
Figure 2:
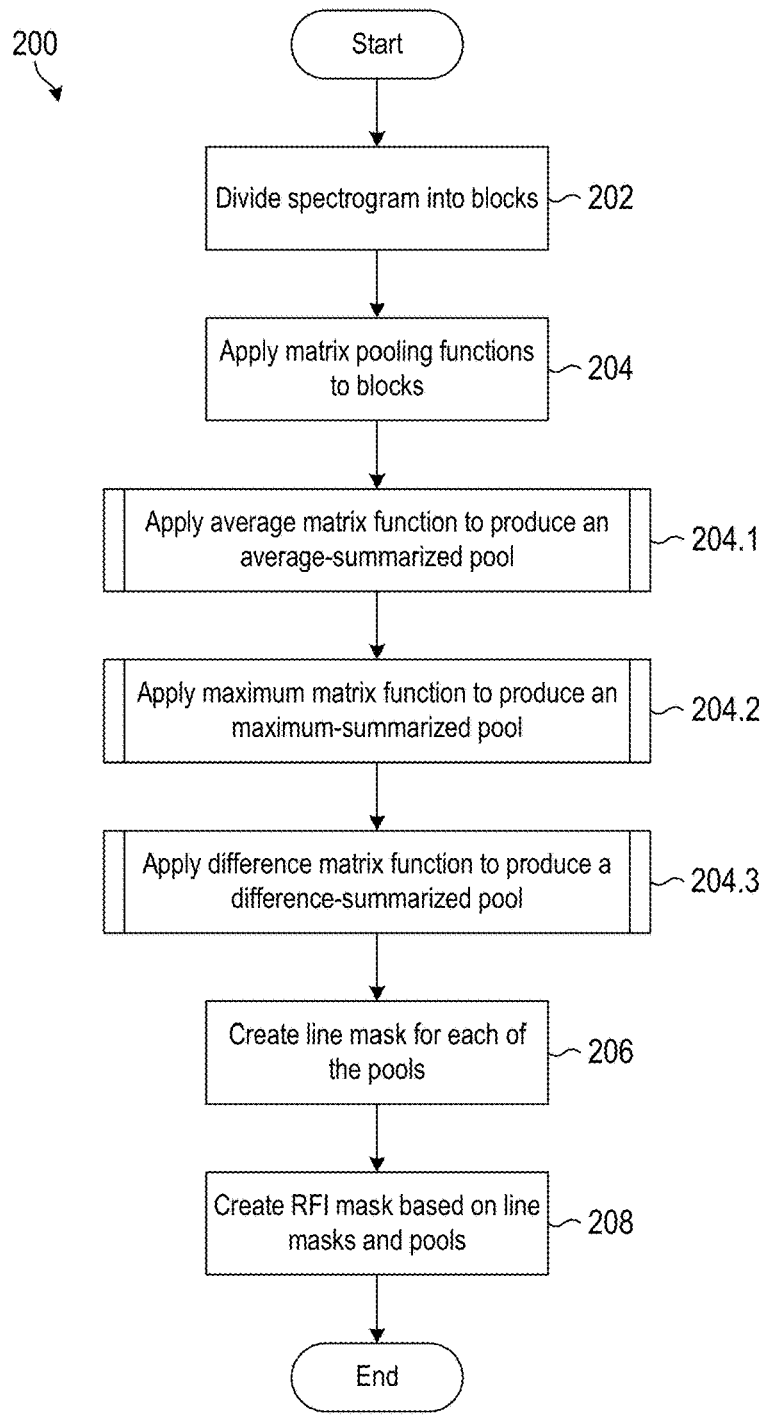
FIG. 2 illustrates a flow diagram of a computer-implemented method to identify RFI in a spectrogram, in accordance with an embodiment of the invention.
Figure 3:
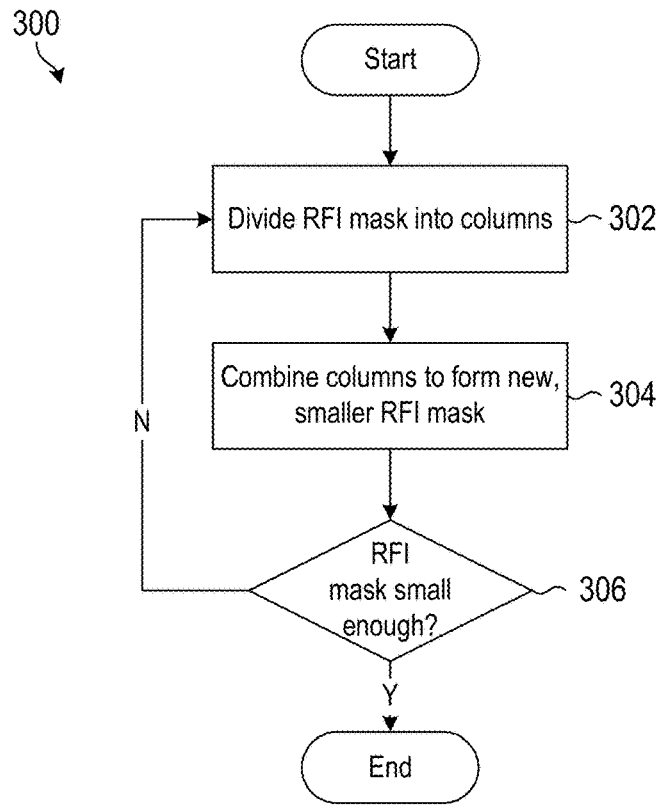
FIG. 3 illustrates a further flow diagram of a computer-implemented method to identify RFI in a spectrogram, in accordance with an embodiment of the invention.

FIG. 1 illustrates a computer system 100 to identify RFI in a spectrogram (e.g., in the spectrogram 400). Similarly, FIGS. 2-3 illustrate computer-implemented methods 200, 300 to identify RFI in the spectrogram 400. Although in this description the system 100 implements the methods 200, 300, the system 100 may be configured to implement a different method and the methods 200, 300 may be implemented by different systems.

The computer system 100 comprises a computer processor 110 communicatively coupled to a computer-readable medium 120. The computer processor 110 may be one or more microprocessors, controllers, or any other suitable computing resource, hardware, software, or embedded logic. Program instructions 122 are stored on the computer-readable medium 120 and are configured to direct the operation of the processor 110. The processor 110 (under the direction of the program instructions 122) comprises a plurality of conceptual modules 112-116 which may correspond to functional tasks performed by the processor 110. The computer system 100 has a communication arrangement 130 for communication with other components and/or communication via a telecommunications network (e.g., the internet).

The computer system 100 comprises a database 120 (or other form of data storage) coupled thereto. The database 102 has stored thereon the spectrogram 400 and other analyzed or summarized data (see below). The entire computer system 100, including the database 102, may be cloud-hosted or provided as a SaaS (Software as a Service). However, given the very large volumes of data which may be associated with the spectrogram 400, local processing (via the processor 110) and local storage (via the database 102) may be computationally quicker.

The computer system 100 has functional modules 112-116 which may comprise routines or functions implemented by the computer program instructions 122. Briefly, a matrix module 112 is configured to perform matrix and blocking functions. For example, the matrix module 122 is operable to divide the spectrogram 400 into a plurality of blocks or tiles. A pooling module 114 is configured to apply various matrix pooling functions to the blocks or other forms of data. A masking module 116 is configured to generate masks and apply the generated masks to pooled matrix data. At various stages, output (e.g., pools, masks) may be stored in the database 102, if desired.

Operation of the system 100 is described with reference to the methods 200-300. The method 200 describes a process for creating an RFI mask, using matrix pooling functions. The method 300 describes a process for pooling the RFI mask itself.

Starting with the method 200, the matrix module 112 divides (at step 202) the spectrogram 400 into a plurality of blocks (or tiles or frames or bins). Each block may be a 2D matrix, e.g., a rectangular matrix. The blocks may be contiguous and non-overlapping. For example, a default block size may be 8 frequency channels (y-axis) and 16 time-steps (x-axis). Each block may therefore have 128 (8×16) data points therein. If a block of 128 data points is reduced to a single scalar value, there may be a 128 times reduction in data size from the original block.

A typical beamformer spectrogram (e.g., the spectrogram 400) may have a frequency channel bandwidth of 1/5th MHz and high sampling rate that does not present Doppler shift over inspected time periods. RFI source catalogues denoted in MHz frequencies may not benefit from 1/5th MHz accuracy and exact time-range specification of RFI events at sampling rate. Given a block size of 8×16, this may yield a 8/5 Mhz block bandwidth and a 1/16 sample rate, which may be sufficient for the purposes of RFI event analysis. More detailed analysis may follow for interesting flagged events.

Once the blocks have been defined, matrix pooling functions can be applied (at step 204) to the blocks by the pooling module 114. Various pooling functions are available which may present or summarize the blocks in different ways or from different perspectives. At least an average matrix function may be applied (at step 204.1) to each of the blocks by the pooling module 114 to produce an average of each block. All of the averaged blocks together form an average-summarized pool, with a size reduction of the block size (e.g. a factor of 128) from the spectrogram 400.

Another matrix pooling function that may be applied (at step 204.2) is a maximum matrix function to determine a maximum value of the block, or a value related to a maximum function of the block. All of the maximum values of the blocks together form a maximum-summarized pool, with a size reduction of the block size from the spectrogram 400.

A further matrix pooling function that may be applied (at step 204.3) is a peak-to-peak matrix function (or a difference function or a maximum vs minimum function) to determine a difference value of the block, or a value related to a difference function of the block. All of the difference values of the blocks together form a difference-summarized pool, with a size reduction of the block size from the spectrogram 400.

Various matrix pooling functions may be employed to reduce the blocks to a scalar or vector value, and then to combine the reduced scalar or vector values in a pool of reduced size relative to the original spectrogram 400. Design requirements may suggest some or all of the above-mentioned pooling functions, or other functions. For example, in astronomical spectrograms, pulsar energy may be present. A combination of the maximum pooling function (step 204.2) and the difference pooling function (step 204.3) may be useful for excluding pulsar energy from other RFI. In non-astronomical spectrograms, the difference pooling function may not be required.

The specific pooling functions that may be used are maxpool (maximum pooling function), avgpool (average pooling function), and ptppool (difference or peak-to-peak pooling function) which are pooling functions associated with AI (Artificial Intelligence) or machine learning through its use in convolutional neural networks as a feature reduction step. Each function may have its advantages. avgpool may be best to capture persistent RFI and may also able to highlight broader lines. maxpool may capture one channel line RFI and very small and sharp RFI events no matter how small. ptppool may suppress broad RFI, such as the pulsar lines, and may also detect low-power lines.

Figure 5:
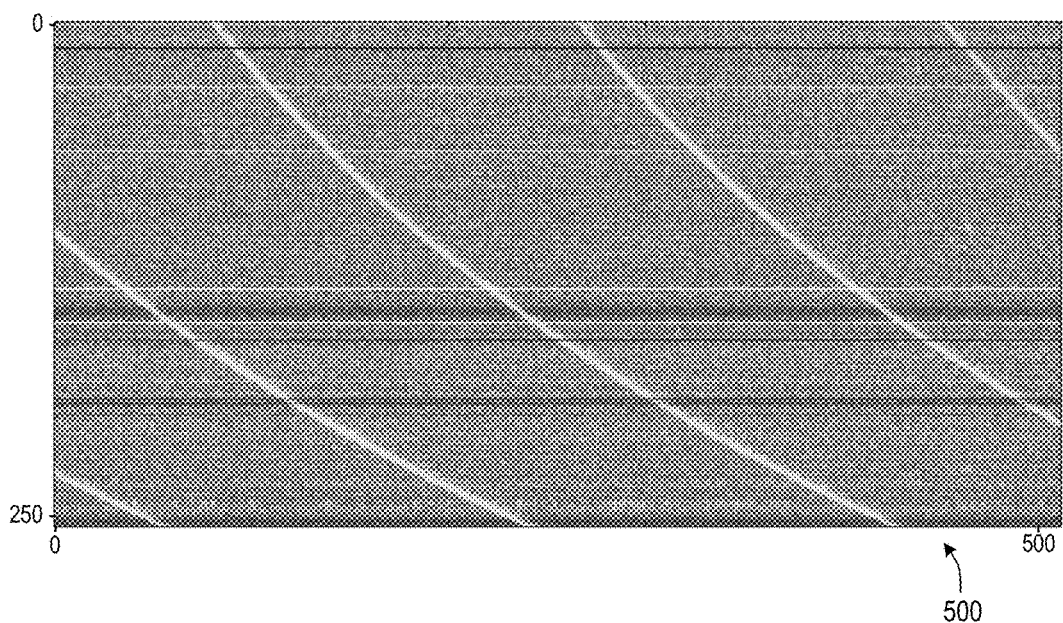
FIGS. 5-7 illustrate summarized pools of the spectrogram, in accordance with an embodiment of the invention.
Figure 6:
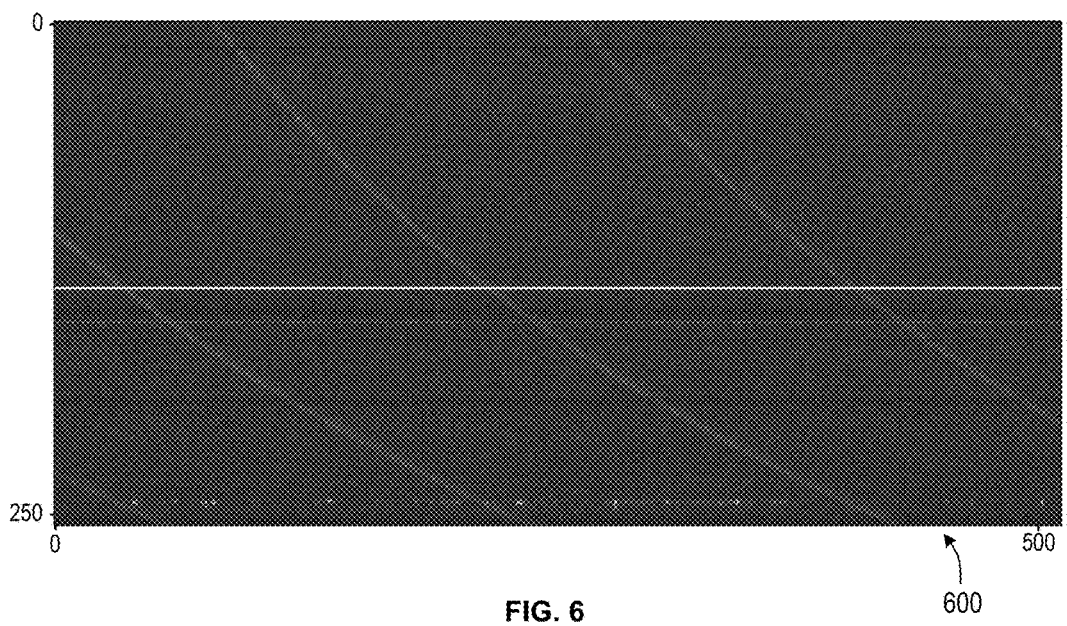
Figure 7:
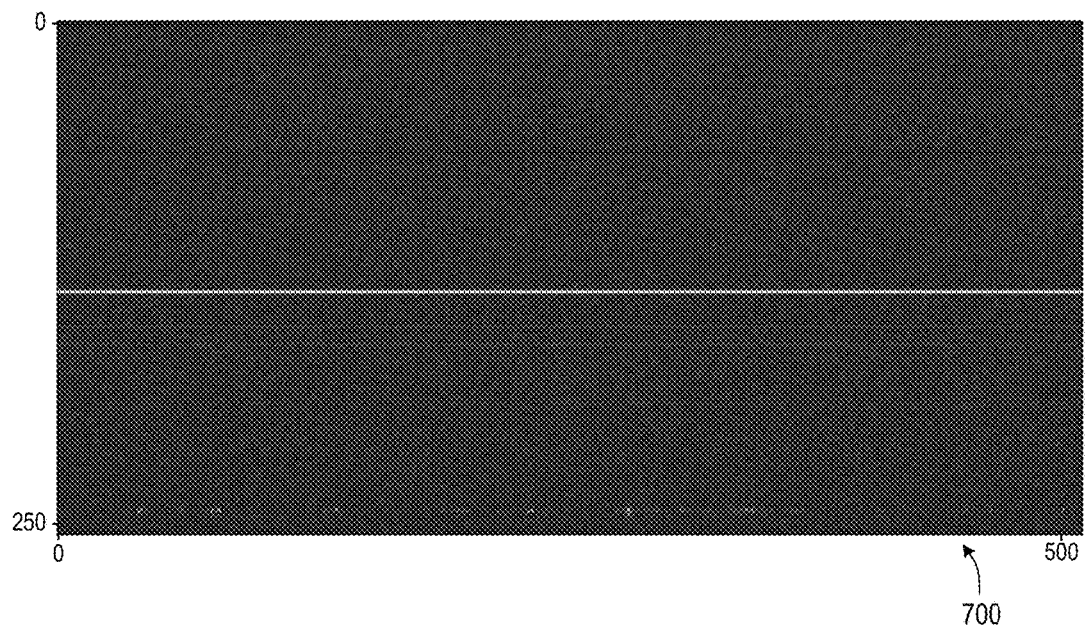
Figure 8:
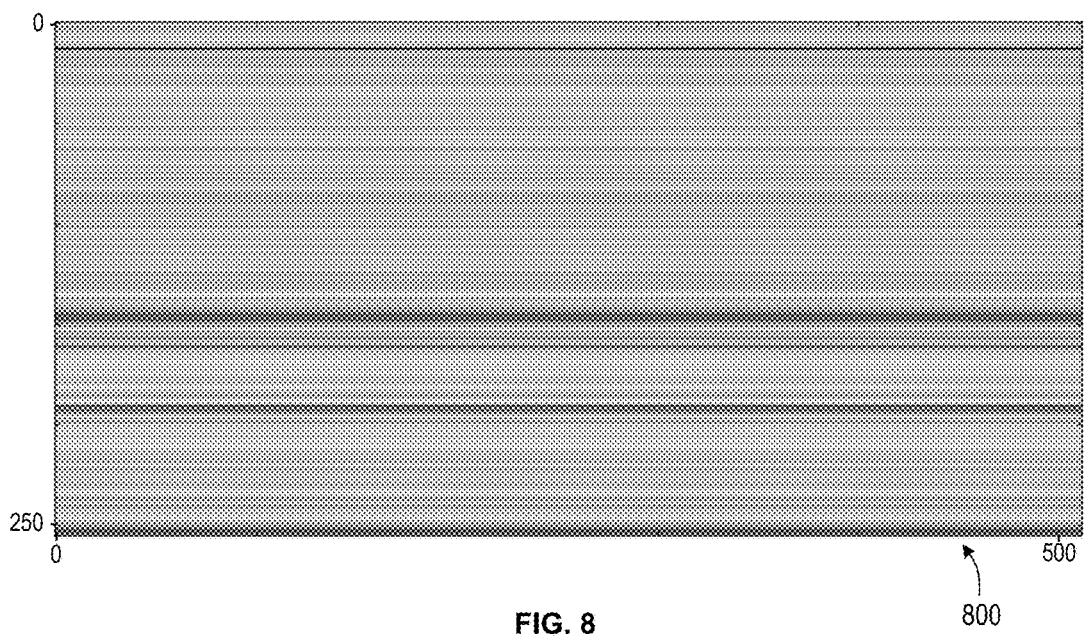
FIGS. 8-10 illustrate median pool lines of the summarized pool of FIGS. 5-7.
Figure 9:
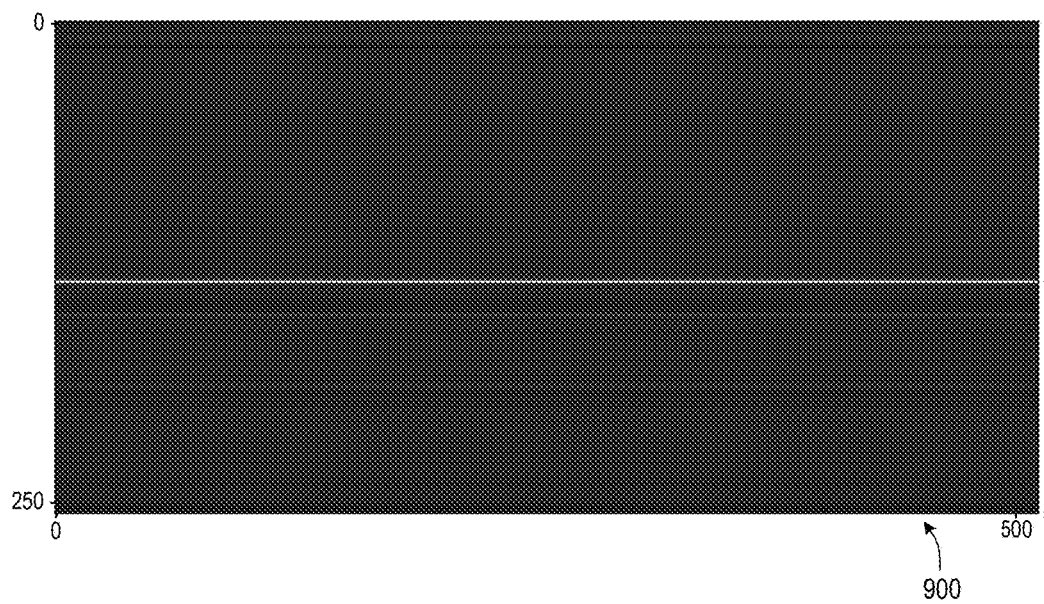
Figure 10:

FIGS. 5-7 respectively illustrate graphical output 500-700 of the avgpool, maxpool, and ptppool functions. Lines in each pool 500-700 are summarized by a median across the time axis (x-axis) for that block, as illustrated in FIGS. 8-10 in graphical images 800-1000. avgpool 500 may detect the most lines 800 but it is harder to set a masking threshold, while maxpool 600 and ptppool 700 may detect only a few lines 900, 1000 and it may be easier to find an appropriate threshold.

For each of the pools 500-700—there are three in this example—a line mask is created (at step 206) by the masking module 116. The line mask is created based on a first set of pre-defined or definable thresholds 118. The thresholds 118 may be pre-defined by a user, or may be manually or automatically defined based on previous or current results to tweak outputs. Each line mask has a minimum significance threshold and a maximum quantity threshold, referred to as the first thresholds to distinguish from those of the RFI mask (see below).

The minimum threshold may serve to ensure that the results are significant and may be statistically related to the pool in question, e.g., being based on a number of standard deviations from the median of the pool 500-700. For example, the first minimum threshold may be 1, 1.5, 2, or the like, standard deviations (std devs) above the median or mean. In this example, a more conservative 2 standard deviations above the median is selected.

Figure 11:
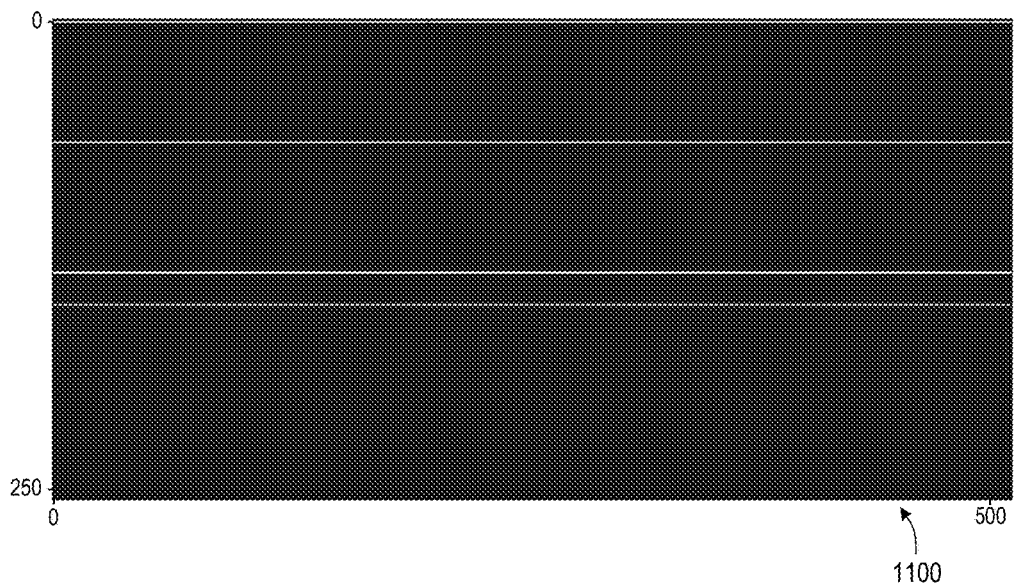
FIGS. 11-13 illustrate line masks of the summarized pools of FIGS. 5-7.
Figure 12:
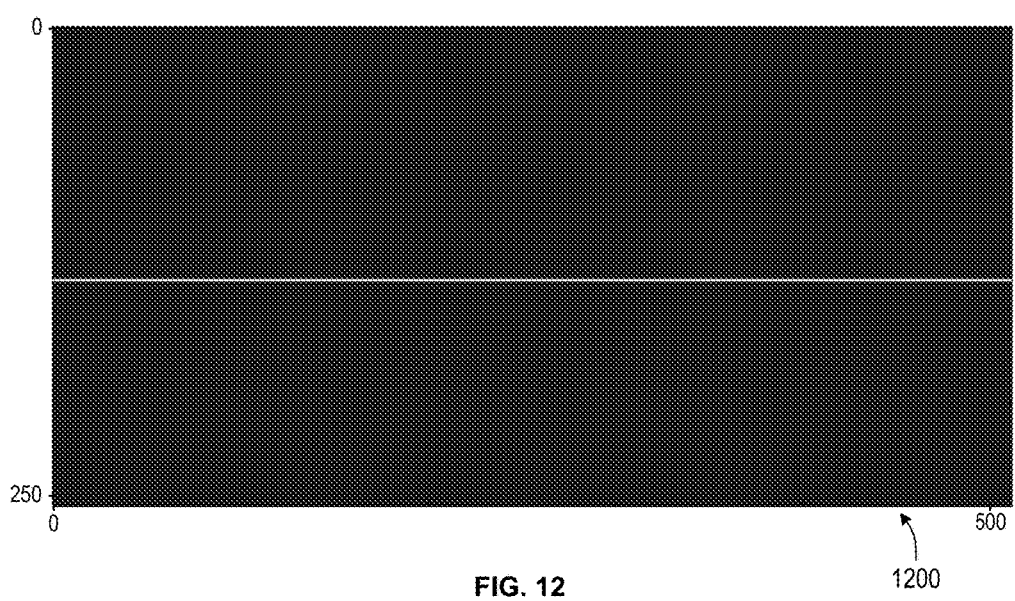
Figure 13:

The maximum threshold may serve to ensure that there are not too many results which may complicate or clutter outputs. In this example, the first maximum threshold is set as a percentile which selects a maximum of 10 lines, but that number could be increased or decreased per requirements. The line masks 1100-1300 are graphically illustrated in FIGS. 11-13.

Next, the RFI mask is created (at step 208). The RFI mask may be a binary mask, with each data point in the mask is indicative of RFI interference, or not. If the ptppool 700 is used, then this may first be combined with the maxpool 600 in a weighted relationship, which may be 50/50 or an unequal relationship. Isolated line RFI is used firstly to remove the associated strong RFI from the particular pool 600-700, whether maxpool 600 or ptppool 700, by replacing the line values with the mean value. This may help to provide more accurate statistical moments for threshold selection for masking.

Isolated line RFI may be used firstly to remove associated strong RFI from the particular pool, whether maxpool 600 or ptppool 700, by replacing the line values with the mean value. This helps to provide more accurate statistical moments for threshold selection for masking. maxpool 600 may provide a bulk of the RFI events, and ptppool 700 may be used mostly to remove broader RFI like the pulsar lines. In high-rate beamformer spectrograms, most line RFI may be restricted across its length to a frequency channel, such as the lines detected by the present method 200. Lines that do not conform to this, such as pulsar lines (illustrated as oblique, arcing lines in avgpool 500 and maxpool 600), would be detected by max pool 600 but not by ptppool 700. Maxpool 600 and ptppool 700 are normalized individually in preparation to combine them for forming the RFI mask.

Figure 14:
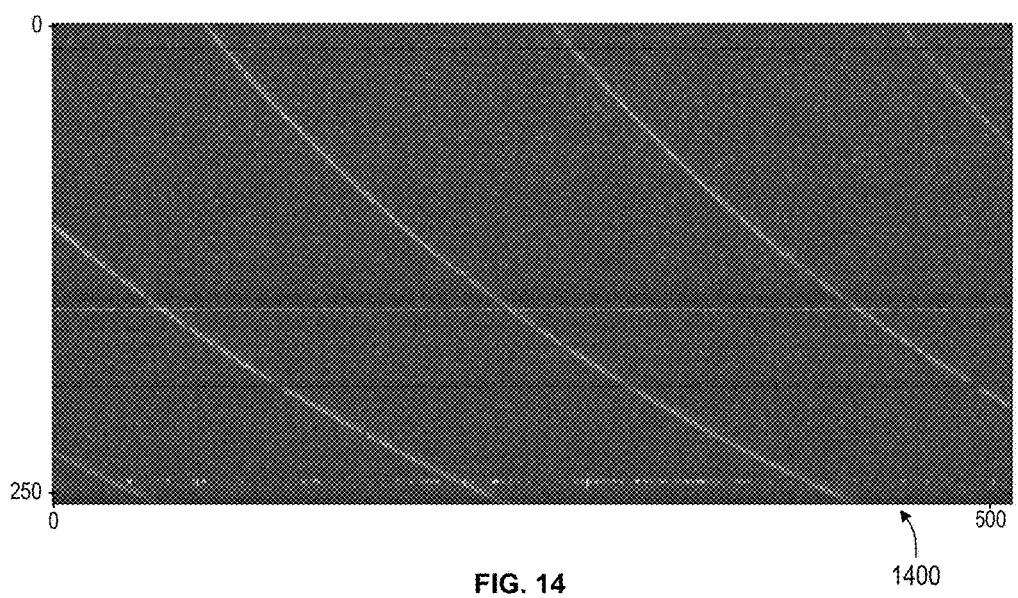
FIGS. 14-15 illustrate normalized pools of the summarized pools of FIGS. 6-7.
Figure 15:
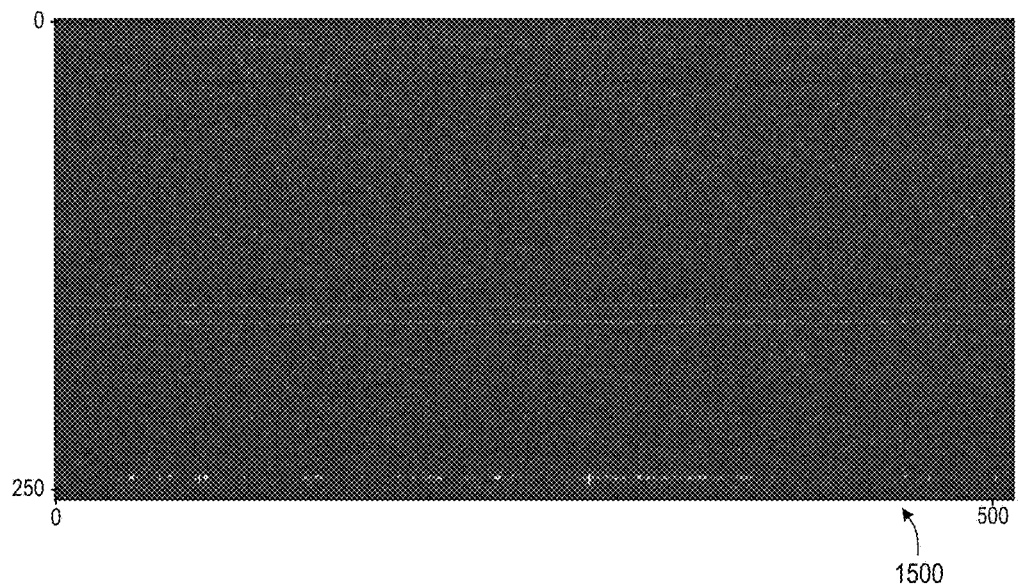

FIG. 14-15 illustrate normalized maxpool 1400 and normalized ptppool 1500.

Figure 16:
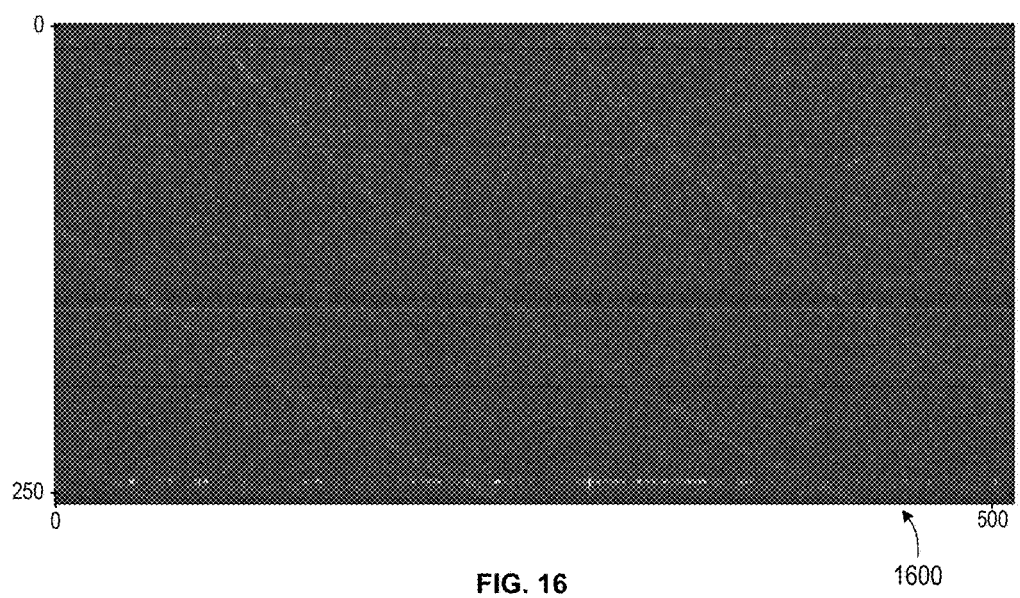
FIG. 16 illustrates a regulated pool of the normalized pools of FIGS. 14-15.

A minimum of the normalized maxpool 1400 and the normalized ptppool 1500 is taken element-wise, which may remove broader RFI from maxpool and low-power lines from ptppool. The result is illustrated by regulated maxpool 1600 in FIG. 16.

Figure 17:
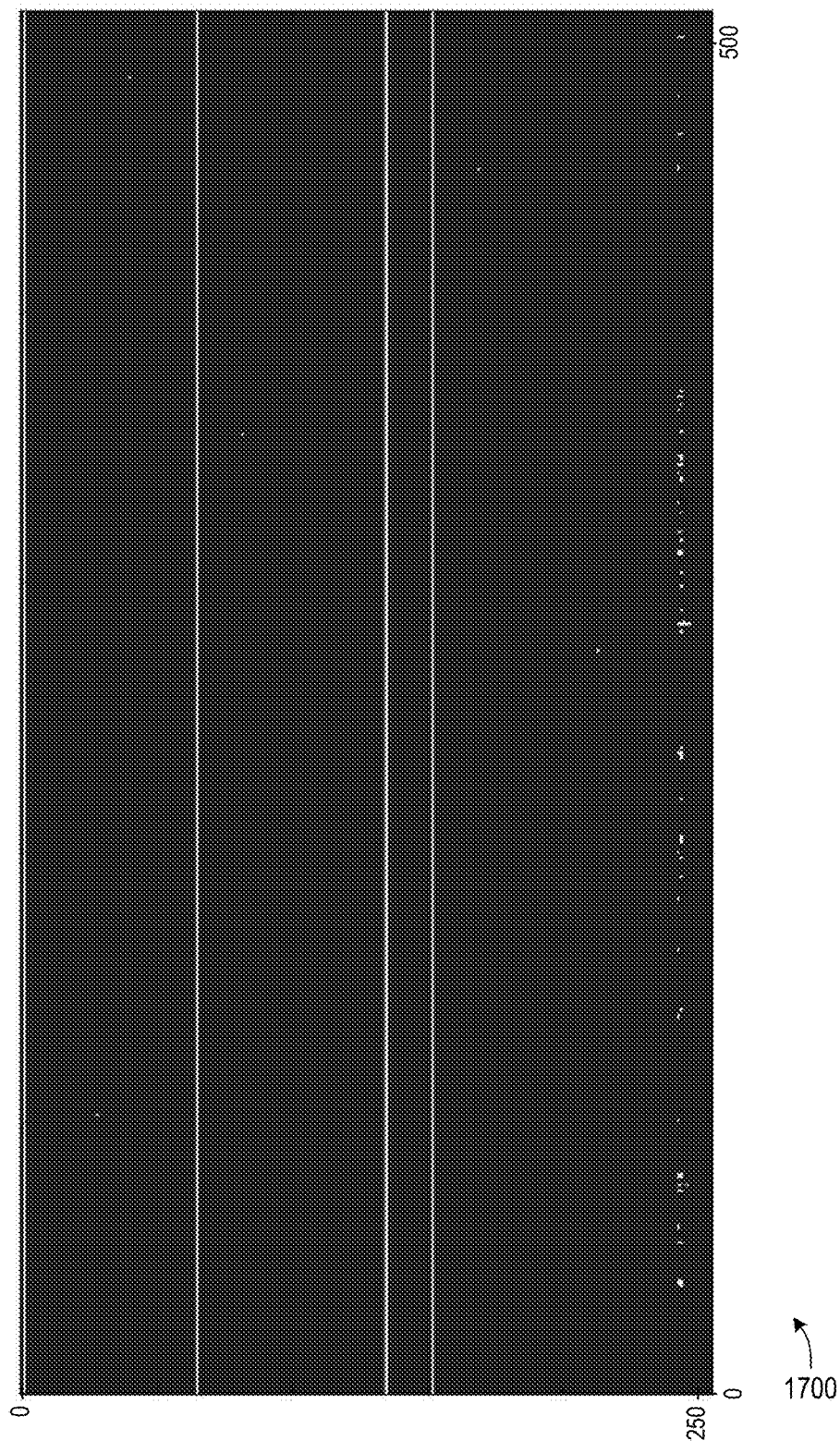
FIG. 17 illustrates an RFI mask, in accordance with an embodiment of the invention.

FIG. 17 illustrate an example RFI mask 1700. The RFI mask 1700 incorporates RFI lines and more isolated RFI events. The RFI mask incorporates the lines masks 1100-1300.

The RFI mask also has two thresholds (referred to as second threshold to distinguish from the line mask thresholds), namely a second minimum significance threshold and a second maximum quantity threshold. The consideration for the second minimum threshold may be similar to those of the first, e.g., 1, 1.5, 2, etc. standard deviations above the mask mean. The second maximum quantity threshold may relate to events rather than lines and may be higher than the first maximum quantity threshold. The second maximum quantity threshold may produce a maximum of 100 RFI events.

Thus, the binary RFI mask 1700 detects a maximum of 10 line RFI and 100 RFI events per block. The line RFI can be registered directly as an RFI event and stored in the database 102. A challenge of detecting shorter line RFI with intermittent microstructure may still remain. The maxpool 600 may overcome the microstructure to connect relatively close RFI. The RFI mask 1700 itself may be iteratively pooled into a single event.

FIG. 3 illustrates the method 300 for pooling the RFI mask 1700 itself, with the method 300 referred to as "infinity pooling". The RFI mask 1700 is divided (at step 302) into columns or cells, by the matrix module 112. The columns are then combined (at step 304) to form a new, smaller RFI mask, by the pooling module 114. This may be repeated (at decision step 306) iteratively until a desired size has been reached. In the present example embodiment, the columns are chosen to be halves of the RFI mask 1700, the halves being contiguous and non-overlapping.

Figure 18:
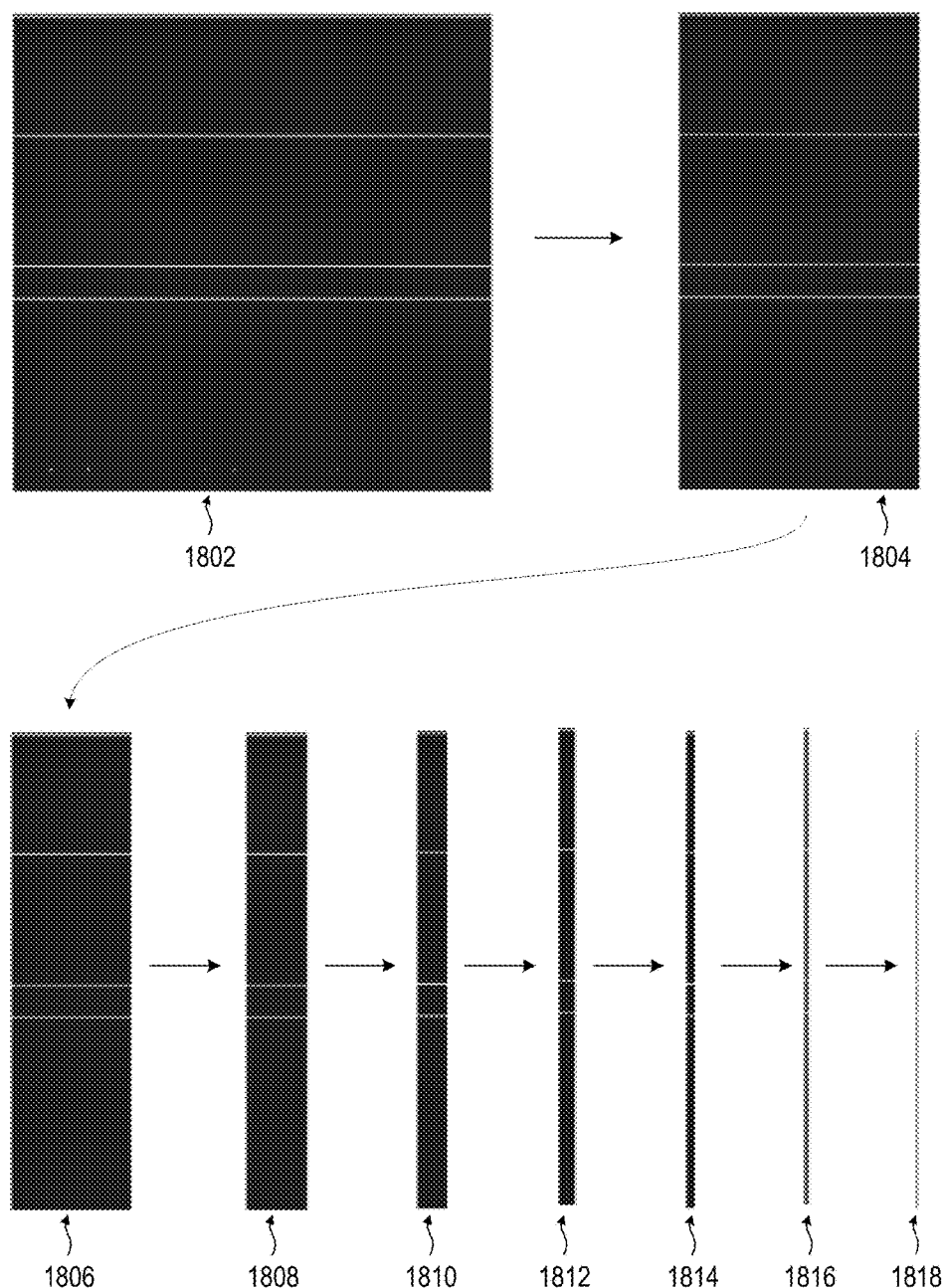
FIG. 18 illustrates an iteratively compressed RFI mask based on the RFI mask of FIG. 17.

FIG. 18 illustrates a series of progressively shrinking compressed RFI masks 1802-1818. The RFI mask 1700 is halved iteratively through peak-to-peak pooling that combines two adjacent non-overlapping mask columns into one, indicating if they are both RFI or not, information that is then used to decide whether to aggregate RFI cell events into one. The desired size may be only a single unit wide. Accordingly, the ptppool of the RFI mask 170 may be done until there is only one unit (or cell or pixel) width for the time axis.

Upon the first detection of line RFI on a particular frequency channel (of maxpool), an RFI event is registered. If the following block still contains this line RFI in the same frequency channel, then the existing RFI event time details are updated to reflect the continuation. Details of the summarized pools 500-700, the various masks 1100-1300, 1700, and the RFI events 1902, 1904 may be stored in the database 102.

Figure 19:
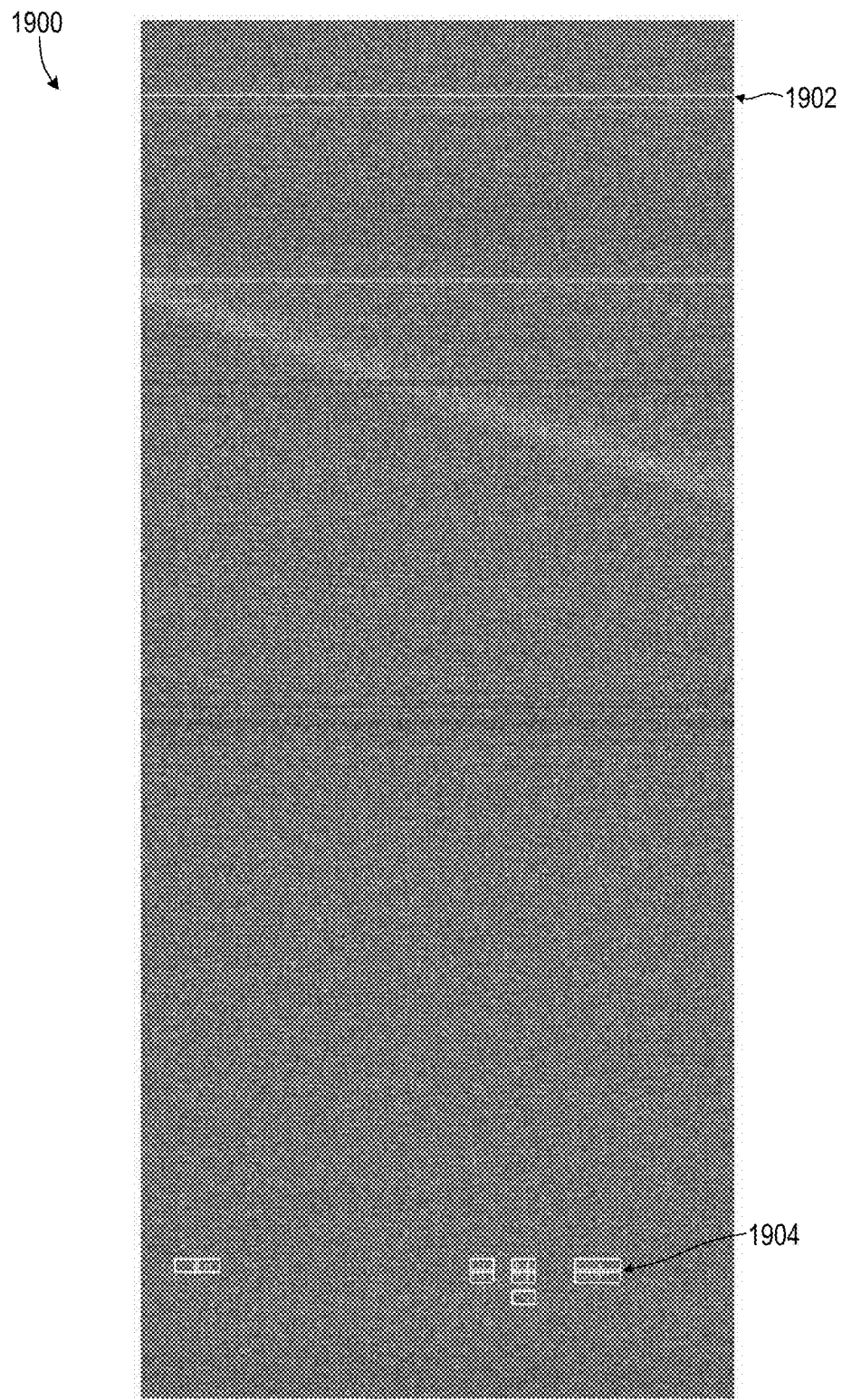
FIG. 19 illustrates a portion of the spectrograph of FIG. 1 with RFI events noted.

FIG. 19 illustrates an extract 1900 from the spectrograph 400 depicting RFI events. A persistent RFI event 1902 may appear as a time-constant line and non-persistent RFI events 1904 may appear in time-varying blocks.

The methods 200, 300 may be advantageous in that they are computationally efficient. The particular combination of different pooling functions in embodiments of the invention allow for robust thresholding that specifies how many RFI events to capture, which may create customizability. Embodiments of the invention may also work for spectrograms work over long time spans to aggregate activity into singular events.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method to identify RPI (Radio Frequency Interference) in a spectrogram, the method comprising:
    dividing, by a matrix module of a computer processor, the spectrogram into a plurality of blocks, each block comprising a matrix of data points;
    applying, by a masking module of the computer processor, a plurality of matrix pooling functions to each block, the plurality of matrix pooling functions configured to produce a plurality of summarized pools;
    creating, by the masking module of the computer processor, a line mask for each of the pools; and
    creating, by the masking module, an RPI mask based at least on the line masks, the RPI mask being indicative of RPI.

2. The computer-implemented method as claimed in claim 1, wherein the plurality of matrix pooling functions comprises at least:
    an average matrix function to produce a scalar average value for each block, thereby to produce an average-summarized pool; and
    a maximum matrix function to produce a scalar maximum value for each block, thereby to produce a maximum-summarized pool.

3. The computer-implemented method as claimed in claim 2, wherein the plurality of matrix pooling functions further comprises a difference matrix function to produce a scalar difference value for each block, thereby to produce a difference-summarized pool.

4. The computer-implemented method as claimed in claim 3, wherein the difference-summarized pool is used, by a pooling module, to regulate the maximum-summarized pool.

5. The computer-implemented method as claimed in claim 1, wherein the line mask has at least one of:
   a minimum significance threshold; and/or
   a maximum quantity threshold.

6. The computer-implemented method as claimed in claim 1, wherein the RPI mask has at least one of:
   a minimum significance threshold; and/or
   a maximum quantity threshold.

7. The computer-implemented method as claimed in claim 1, wherein the mask is a binary mask, wherein each data point in the mask is indicative of RPI interference, or not.

8. The computer-implemented method as claimed in claim 1, further comprising:
   dividing, by the matrix module, the RPI mask into columns; and
   combining, by a pooling module, the columns to form a new RPI mask.

9. The computer-implemented method as claimed in claim 8, which is repeated iteratively until the new RPI mask has reached a desired size.

10. The computer-implemented method as claimed in claim 9, in which the columns desired size is a single unit wide.

11. The computer-implemented method as claimed in claim 8, wherein the columns are of equal size, represent a half of the RPI mask, contiguous, and non-overlapping.

12. The computer-implemented method as claimed in claim 8, in which combining the columns comprises using difference or peak-to-peak pooling.

13. A computer system to identify RPI (Radio Frequency Interference) in a spectrogram, the computer system comprising:
   a computer processor; and
   a computer readable storage medium having stored thereon program instructions executable by the computer processor to direct the operation of the processor, wherein the computer processor, when executing the program instructions, performs operations comprising:
   dividing the spectrogram into a plurality of blocks, each block comprising a matrix of data points;
   applying a plurality of matrix pooling functions to each block, the plurality of matrix pooling functions configured to produce a plurality of summarized pools; and
   applying a line mask for each of the pools and to create an RPI mask based at least on the line masks, the RPI mask being indicative of RPI.

14. The computer system of claim 13, wherein the pooling module is configured to apply: an average matrix function to produce a scalar average value for each block, thereby to produce an average-summarized pool; and
   a maximum matrix function to produce a scalar maximum value for each block, thereby to produce a maximum-summarized pool.

15. The computer system of claim 14, wherein the pooling module is configured to apply a difference matrix function to produce a scalar difference value for each block, thereby to produce a difference-summarized pool.

16. The computer system of claim 13, wherein each of the line mask and the RPI mask has at least one of:
   a minimum significance threshold; and/or
   a maximum quantity threshold.

17. The computer system of claim 13, wherein:
   the matrix module is configured to divide the RPI mask into columns; and
   the pooling module is configured to combine the columns to form a new, smaller RPI mask.

18. The computer system of claim 17, wherein the dividing and pooling are repeated iteratively until the new, smaller RPI mask has reached a desired size.

19. A computer program product to identify RPI (Radio Frequency Interference) in a spectrogram, the computer program product comprising:
   a non-transitory computer-readable medium having stored thereon:
   first program instructions executable by a computer processor to cause the computer processor to divide the spectrogram into a plurality of blocks, each block comprising a matrix of data points;
   second program instructions executable by the computer processor to cause the computer processor to apply a plurality of matrix pooling functions to each block, the plurality of matrix pooling functions configured to produce a plurality of summarized pools; and
   third program instructions executable by the computer processor to cause the computer processor to create a line mask for each of the pools and to create an RPI mask based at least on the line masks, the RPI mask being indicative of RPI.

20. The computer program product of claim 19, wherein:
   the first program instructions are executable by the computer processor to cause the computer processor to divide the RPI mask into columns; and
   the second program instructions are executable by the computer processor to cause the computer processor to combine the columns to form a new RPI mask.

* * * * *